(12) United States Patent
Gannon

(10) Patent No.: US 8,272,631 B2
(45) Date of Patent: Sep. 25, 2012

(54) MELON HOLDER

(76) Inventor: John Michael Gannon, Belleville (CA)

( * ) Notice: Subject to any disclaimer, the term of this patent is extended or adjusted under 35 U.S.C. 154(b) by 315 days.

(21) Appl. No.: 12/654,614

(22) Filed: Dec. 24, 2009

(65) Prior Publication Data

US 2010/0164157 A1 Jul. 1, 2010

(51) Int. Cl.
B25B 11/00 (2006.01)
B26D 7/02 (2006.01)
(52) U.S. Cl. ............ 269/90; 83/763; 269/87.2; 269/153
(58) Field of Classification Search ............... 296/90, 296/153, 289 R, 295, 86, 87.2, 165; 83/762, 83/763, 452, 454, 597; 99/537, 538, 567
See application file for complete search history.

(56) References Cited

U.S. PATENT DOCUMENTS 1,703,154 A * 2/1929 Lanzkron .......................... 83/762
2,398,192 A * 4/1946 Scheminger, Jr ................ 83/762
4,118,021 A * 10/1978 DeLomba ......................... 269/86
4,140,340 A * 2/1979 Cloutier ........................... 269/295
5,823,079 A * 10/1998 Liu et al. .......................... 83/762

* cited by examiner

Primary Examiner — Hadi Shakeri

(57) ABSTRACT

The melon-holder includes an elongated base having a pair of jaws each pivotal about a separate side of the base. The jaws are pivotal from a melon-engaging position to a melon-releasing position. The jaws have a number of lateral spaces which are spaced apart from one another and which are adapted to receive a knife for cutting the melon into lateral slices while the jaws are in the melon-engaging position.

9 Claims, 4 Drawing Sheets

MELON HOLDER

FIELD OF THE INVENTION

This application claims priority pursuant to 35 U.S.C. 119 based on Canadian application No. 2,648,436, filed Dec. 31, 2008, which application is incorporated herein by reference in its entirety.

This invention relates to devices for supporting melons while they are being prepared for consumption and more particularly to a holder for use in supporting a melon so that it can be cut into slices.

BACKGROUND OF THE INVENTION

Melons, because of their tendency to roll when they are placed on flat surfaces, are difficult to cut into segments suitable for consumption. A number of holders are known for immobilizing the fruit so that it can be cut into segments. U.S. Pat. No. 4,140,340 to Cloutier for example, describes a tray having ribs for supporting a melon while it is being cut. The tray however is not very effective in doing so when, for example, the fruit is wet and slippery or when the fruit is an irregular shape and does not contact the ribs along its entire length. In such cases, the fruit tends to roll or slide along the tray and is little easier to cut than if it is not supported at all.

I have invented a holder for melon which contacts both the lower and upper walls of the fruit. Sufficient pressure is applied to the upper walls to restrain the fruit from moving but insufficient to damage the fruit. While the fruit is held by the holder, it does not roll or move longitudinally but is immobilized. The fruit can be easily cut into segments while it is immobilized in this manner.

SUMMARY OF THE INVENTION

Briefly, the melon-holder of my invention includes an elongated base having a pair of first and second jaws each pivotal about a separate side of the base. The jaws are pivotal from a melon-engaging position to a melon-releasing position. The jaws have a number of lateral slits which are spaced apart from one another and which are adapted to receive a knife for cutting the melon into lateral slices while the jaws are in the melon-engaging position.

DESCRIPTION OF THE DRAWINGS

The melon-holder of the invention is described with reference to the accompanying drawings in which.

Like reference characters refer to like parts throughout the description of the drawings.

DESCRIPTION OF PREFERRED EMBODIMENTS

Figure 1:
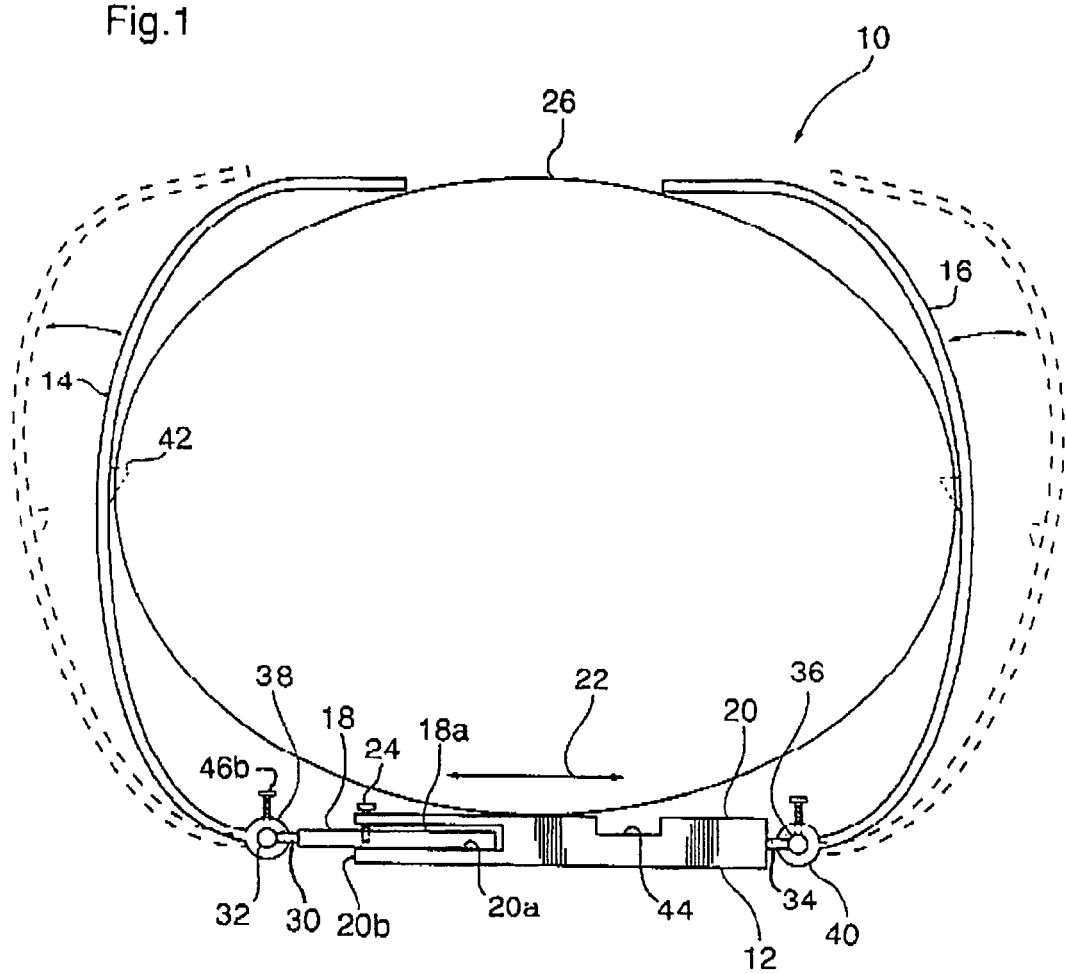
FIG. 1 is an elevation of the melon-holder viewed from an end.

With reference to FIG. 1, the melon-holder of the invention, generally 10, is composed of a base 12 and a pair of jaws, a first jaw 14 and a second jaw 16. The two jaws are semi-circular in shape to conform roughly to the shape of the side walls of melon 26.

In the description which follows the melon is referred to as a "watermelon" but it is to be understood that the melon may be other than a watermelon such as a cantaloupe, a honeydew and the like.

The base is composed of first and second basal elements 18, 20. The second basal element 20 has a longitudinally extending groove 20a which extends inward from side wall 20b. The front portion 18a of the first basal element is slidingly accommodated in the groove and the two basal elements can be moved sideways in the direction of arrow 22 in order to adjust the effective width of the base.

A thumbscrew 24 is threadably attached to the second basal element and extends into the groove where it contacts the first basal element and immobilizes it. The thumbscrew, when loosened, allows the position of the two basal elements to be adjusted relative to each other. Hence, the effective width of the base can be adjusted according to the size of the watermelon.

A pin extends outward from. each end of the first basal element. One pin is visible in FIG. 1 and is numbered 30. The pin at the other end is not visible in the Figure. The pins interconnect the basal element with a guide rod 32 which runs parallel to the longitudinal axis of the melon-holder. Pins similarly extend outwardly from opposite ends of the second basal element. One such pin is visible in FIG. 1 and is numbered 34. The latter pins interconnect the second basal element to a second guide rod 36.

Tubes 38, 40 are disposed about guide rods 32, 36 respectively and each tube is attached to a separate jaw. By means of the tubes and the guide rods, the jaws pivot relative to the base from a melon-engaging position illustrated in solid lines in FIG. 1 to a melon-releasing position shown in broken lines in the same Figure.

Immobilizing members 42 are attached to the inside walls of the jaws for stabilizing the watermelon in the holder. Like members can also be attached to the jaws near their lower ends for holding the watermelon above the base. The latter members function to facilitate the cutting of the melon.

A number of longitudinal extending troughs 44 (one illustrated in FIG. 1) are formed in the upper wall of the base for collecting any juice which drops onto the base as the watermelon is being cut.

Figure 2:
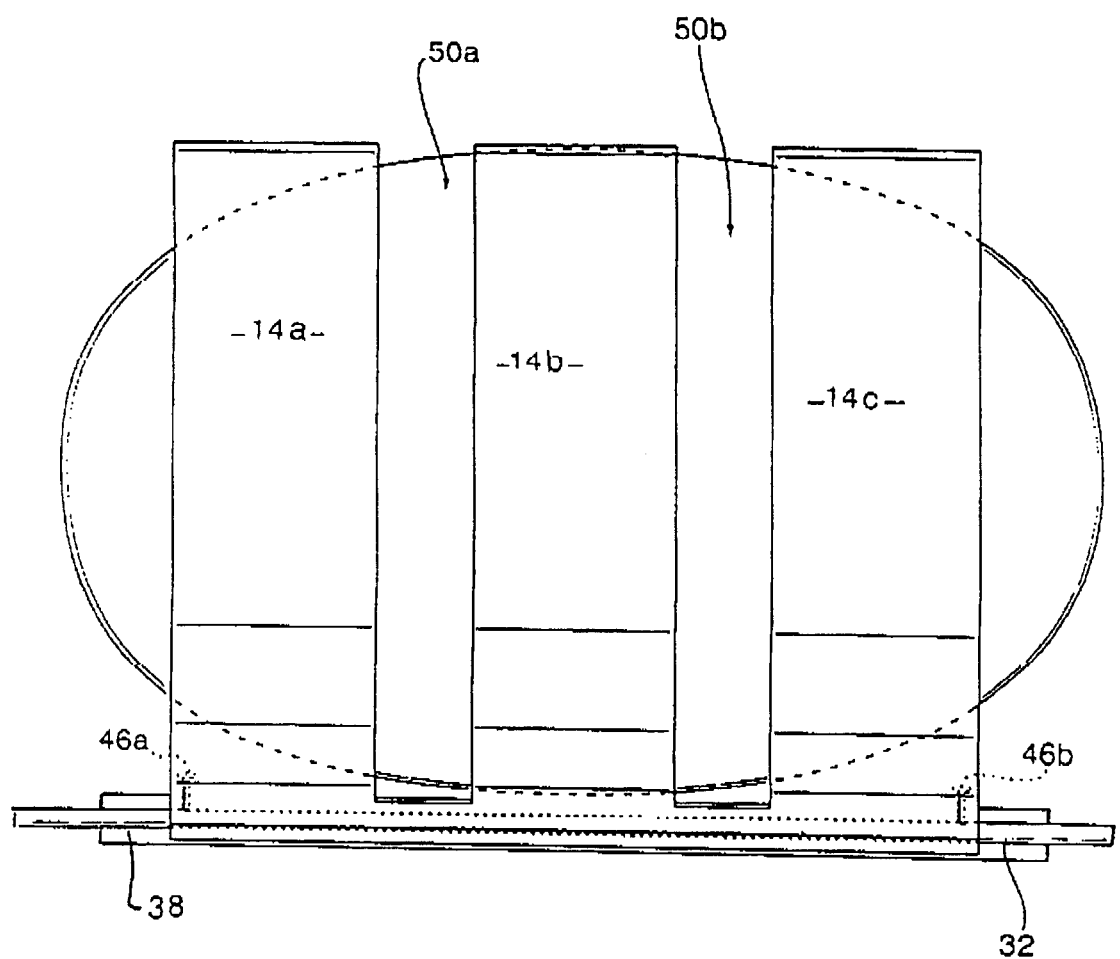
FIG. 2 is an elevation of the melon-holder viewed from a side.

With reference to FIG. 2, jaw 14 is made up of a number of spaced apart segments 14a,b and c, each of which being attached to tube 38. Thumbscrews 46a,b are provided to selectively prevent the tube from sliding or pivoting on guide rod 32.

Jaw 16 is similarly composed of a number of segments which are mounted on tube 40 and the tube can be prevented from sliding on guide rod 36 by one or more thumbscrews.

The segments 14a,b and c of jaw 14 are separated by lateral spaces or slits 50a,b and similar spaces are formed in the other jaw. The spaces are spaced apart from one another and are adapted to receive a knife for cutting the watermelon into segments while the jaws are in the melon-engaging position.

Figure 3:
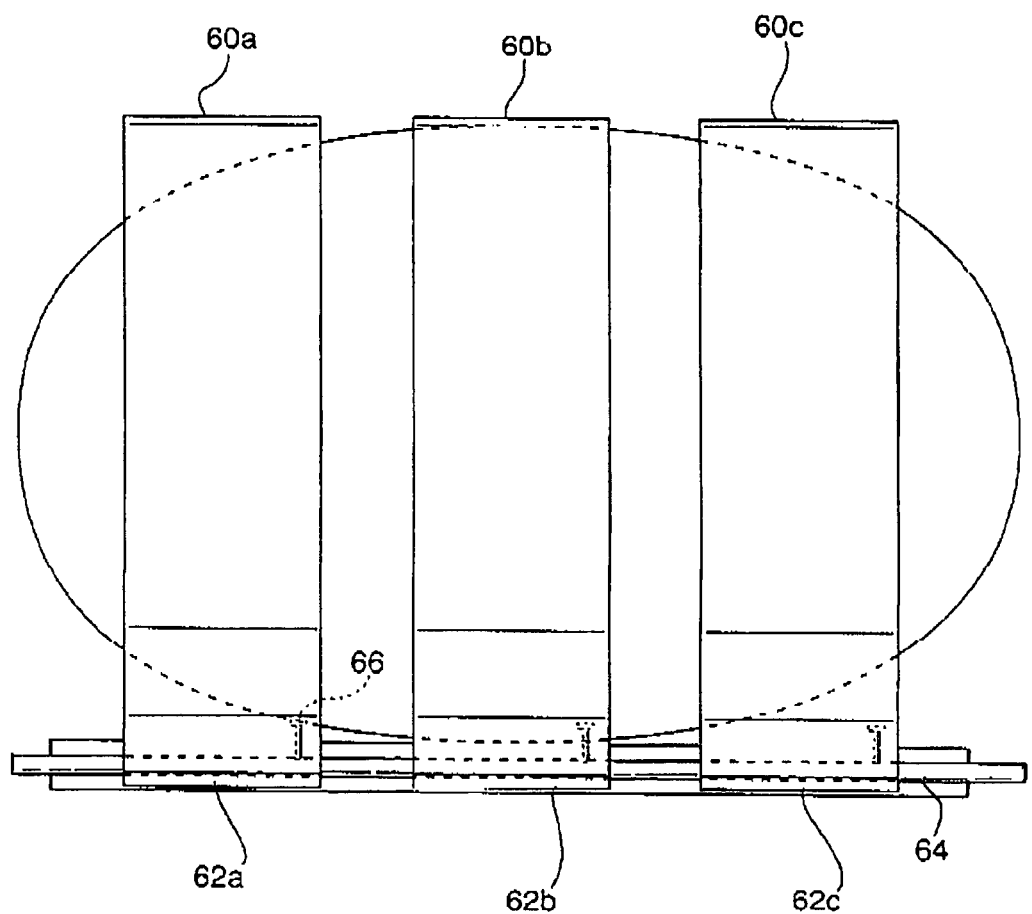
FIG. 3 is an elevation of a second embodiment of the melon-holder from a side.
Figure 4:
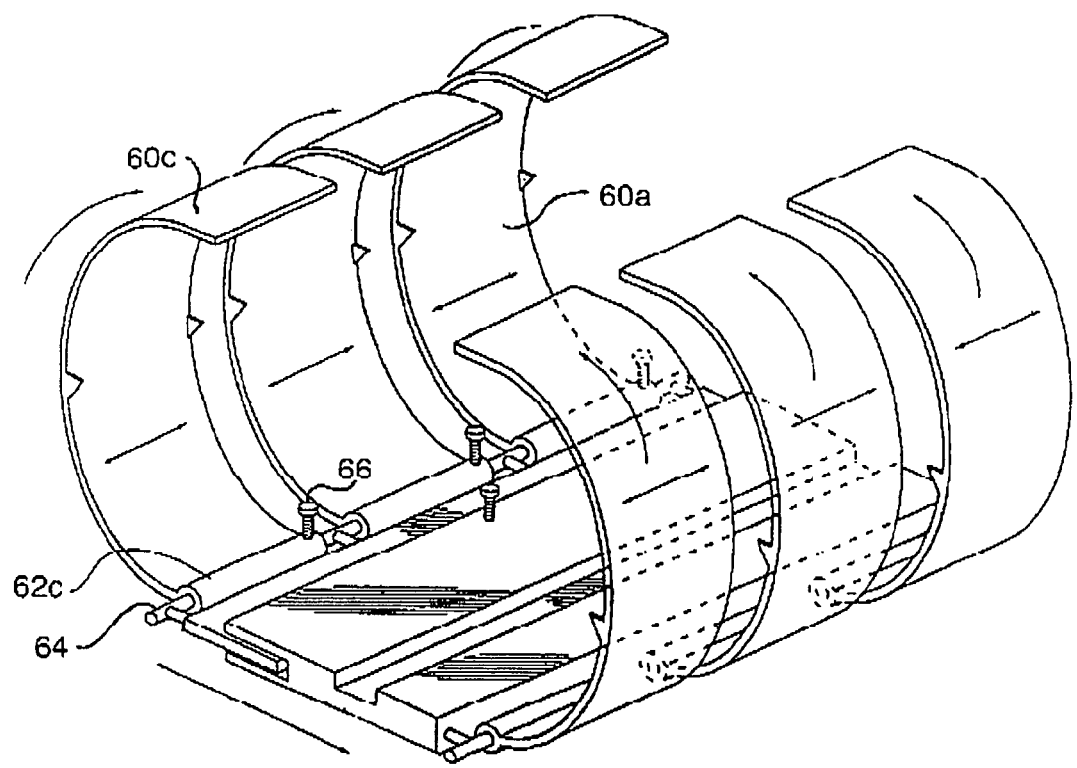
FIG. 4 is a perspective view of the second embodiment of the melon holder.

The melon-holder illustrated in FIGS. 3 and 4 is similar to that illustrated in the previous figures except that segments 60a,b and c of the jaw pivot and slide independently of each other. Each segment is permanently mounted to a separate piece 62a,b and c of a tube and the tube is mounted about a guide rod 64. A thumbscrew 66 is threadable received in each piece of the tube for selectively immobilizing that piece on the guide rod.

The structure of the jaw on the opposite side of the melon holder is the same as that of jaw 60.

The advantage of the embodiment of the invention illustrated in FIGS. 3 and 4 over the embodiment illustrated in FIGS. 1 and 2 is that the spaces between adjacent components of the jaw can be adjusted in order to accommodate knives of different thicknesses and sizes.

It will be understood, of course, that modifications can be made in the structure of the melon-holder of the invention without departing from the scope of the invention. As for the jaws, for example, they need not have spaces or slits for receipt of a knife if the jaws are movable in the manner illustrated in FIGS. 3 and 4. As well, only one jaw is needed if it is approximately three quarters of the circumference of a circle as opposed to one half as illustrated in the drawings and if the slits are long enough that the watermelon can be cut from top to bottom by a knife. As for the base, its length can be adjustable in the same manner as its width if it is provided with longitudinal extending basal elements which interconnect in the same manner as basal elements 18, 20 in FIG. 1.

I claim:

1. A melon-holder for use in supporting a melon while being cut into slices, said holder including:
    an elongated base having a longitudinal axis,
    a pair of first and second jaws each pivotal about a separate side of said base, said jaws being pivotal from a melon-engaging position to a melon-releasing position,
    said jaws having a plurality of lateral slits which are spaced apart from one another and which are adapted to receive a knife for cutting said melon into lateral slices while said jaws are in said melon-engaging position,
    means for moving each said jaw parallel to the longitudinal axis of said base such that the position of said slits relative to said melon is adjustable, and
    wherein each said first and second jaw is composed of a plurality of segments, each said segment being separated from an adjacent said segment by one said lateral slit, each said segment in said first jaw adapted to pivot independently of the other segments in said first jaw while each said segments in said second jaw is adapted to pivot independently of the other segments in said second jaw.

2. The melon holder of claim 1 wherein each said first and second jaw is composed of a plurality of segments, each said segment being separated from an adjacent said segment by one said lateral slit, all the segments in each said first jaw and said second jaw pivoting as a unit.

3. The melon-holder of claim 1 further including means for adjusting the width of said base such that the space between said jaws while said melon-holder is in said melon-engaging position is adjustable.

4. The melon-holder of claim 1 further including: an immobilizing member associated with said jaw for immobilizing said melon while said jaws are in said melon-engaging position.

5. The melon-holder of claim 1 wherein said base has a trough for collecting any juice which drops onto said base as said melon is being cut.

6. The melon-holder of claim 1 wherein said melon is a watermelon and said melon-holder is adapted to support said melon such that the longitudinal axes of said base and said watermelon are parallel to one another.

7. The melon-holder of claim 1 further including a guide rod disposed on each side of said base; a tube disposed about each said guide rod, each said tube being composed of a plurality of disconnected pieces, each said segment of said first jaw being connected to a separate one of said pieces of one said tube while each said segment of said second jaw all being connected to a separate one of said pieces of the other said tube.

8. A melon-holder for use in supporting a melon while being cut into slices, said holder including:
    an elongated base having a longitudinal axis,
    a pair of first and second jaws each pivotal about a separate side of said base, said jaws being pivotal from a melon-engaging position to a melon-releasing position,
    said jaws having a plurality of lateral slits which are spaced apart from one another and which are adapted to receive a knife for cutting said melon into lateral slices while said jaws are in said melon-engaging position,
    means for moving each said jaw parallel to the longitudinal axis of said base such that the position of said slits relative to said melon is adjustable,
    wherein each said first and second jaw is composed of a plurality of segments, each said segment being separated from an adjacent said segment by one said lateral slit, all the segments in each said first jaw and said second jaw pivoting as a unit,
    further including a guide rod disposed on each side of said base; a tube disposed about each said guide rod, said segments of said first jaw all being connected to one said tube while said segments of said second jaw all being connected to the other said tube,
    wherein said tubes are selectively slidable along said guide rods such that the position of said slits relative to said melon is adjustable,
    further including means for adjusting the width of said base such that the space between said jaws while said melon-holder is in said melon-engaging position is adjustable, and
    wherein said tubes are selectively slidable along said guide rods such that the position of said slits relative to said melon is adjustable.

9. The melon-holder of claim 8 further including means for adjusting the width of said base such that the space between said jaws while said melon-holder is in said melon-engaging position is adjustable.

\* \* \* \* \*